Nov. 14, 1939.    M. PIER    2,179,829
PRODUCTION OF LIQUID HYDROCARBONS
Original Filed Sept. 19, 1936
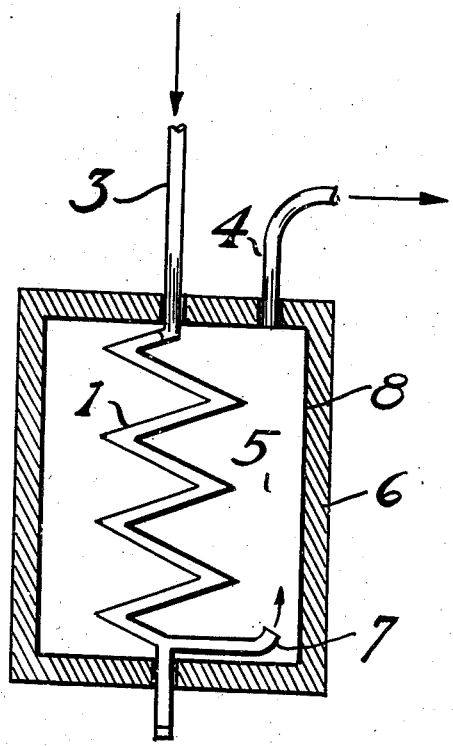
Mathias Pier Inventor

UNITED STATES PATENT OFFICE 2,179,829

PRODUCTION OF LIQUID HYDROCARBONS

Mathias Pier, Heidelberg, Germany, assignor to I. G. Farbenindustrie Aktiengesellschaft, Frankfort-on-the-Main, Germany Application September 19, 1936, Serial No. 101,590. Renewed August 12, 1938. In Germany September 21, 1935

5 Claims. (Cl. 196—10)

The present invention relates to the production of liquid hydrocarbons, especially those of low boiling point, from gaseous hydrocarbons.

It has already been proposed to convert normally gaseous paraffin hydrocarbons, such as natural gas, butane or propane, by thermal treatment into olefines and to polymerise the latter to liquid hydrocarbons of low boiling point (not substantially above 200° C.), such as benzine, benzene or its homologues. In the said process waste usually occurs in either stage by the formation of products of high molecular weight and in some cases coky products.

I have now found that the said drawback can be avoided by leading the initial gaseous paraffin hydrocarbons, preferably under pressure, at elevated temperature, advantageously above 500° C., through a heated tubular conduit composed of material stable to high temperature, in particular of material containing silicon, which is situated within a vessel, thereby causing at least a partial dehydrogenation of the said gaseous paraffin hydrocarbons and then subjecting the dehydrogenated hydrocarbons to polymerization by leading the resulting gas at a lower temperature through the space of said vessel which surrounds the said tubular conduit, the resulting liquid fraction being condensed and the non-condensable gaseous hydrocarbons returned again if desired.

For the purpose of carrying out the process there may be used for example a long vessel, as for example a tower-like vessel, in which there is situated a tube in a straight or coiled form. The tube preferably consists of an infusible material containing silicon, as for example silicon carbide or silicon iron alloys. Heat resistant metal tubes which have been lined with material of the said kind or which consist of or are coated with metals or alloys which do not promote the deposition of carbon black, such as chromium steels, may also be employed. One end of the tube is secured to the upper or lower cover of the vessel and serves as the inlet for the gas to be treated; the other end of the tube opens into the vessel itself. The vessel consists of a material which is preferably capable of withstanding pressure, such as steel. The inner wall of the vessel may be lined, for the purpose of making it more stable to the attack by the reacting substances or of catalytically promoting the conversion with zinc, aluminium, chromium, brass or silicon and the vessel is preferably insulated at the outer surface. The heating of the tube is preferably effected electrically, for example by means of an electric resistance. The gases, which enter the tube in a cold or pre-heated stage, are exposed therein to a temperature of from about 500° to 900° C., whereby a large portion of the gases is converted into unsaturated hydrocarbons. The temperature selected depends on the nature of the initial materials; thus for example in the case of hydrocarbons of low molecular weight, such as ethane, a higher temperature, for example from 600° to 800° C., is employed than in the case of hydrocarbons of higher molecular weight, such as butane or pentane. The unsaturated hydrocarbons obtained then pass into the wider vessel in which a temperature of from about 300° to 500° C. prevails. The temperature in the vessel may even be higher than 500° C., as for example from 500° to 800° C., when a still higher temperature is employed in the first stage. Generally speaking, however, it should be at least about 20° lower than in the first stage. The period during which the gases remain in the apparatus is so adjusted by a suitable throughput and pressure that the desired polymerization takes place. Generally speaking the gases should remain more than 3 minutes. The products leaving the vessel and containing vaporous normally liquid hydrocarbons in addition to gases are then subjected to condensation in a condenser, the condensate then being stabilized i. e. freed from the bulk of gaseous hydrocarbons dissolved therein. The unconverted gaseous hydrocarbons may be advantageously returned to the process either wholly or in part, for example after separating certain constituents, as for example methane and hydrogen. The olefines still contained in the gases may be separated and converted into liquid products for example with polymerizing agents, such as sulphuric acid. The polymerization proceeds best under pressures above 20 atmospheres, as for example from 50 to 100 atmospheres; pressures of 300 atmospheres or more, as for example 350 atmospheres or more, are, however, especially suitable. Known catalysts which promote the conversions may also be employed.

According to this invention hydrocarbons of low boiling point having good anti-knock properties are obtained which are suitable for admixture with other kinds of benzine.

By the process according to this invention a far-reaching conversion of the gases to liquid hydrocarbons is obtained on the one hand and, by the special arrangement of the apparatus, only a slight amount of energy is necessary on the other hand.

The accompanying drawing shows in a diagrammatic manner a vertical section of an apparatus in which the process according to the present invention may be carried out with advantage.

Referring to this drawing in detail the initial hydrocarbon gas is introduced through pipe 3 into coil 1 which is heated by some suitable means, as for example electrically. After having passed through this coil the hot gases issue by way of pipe 7 into the free space 5 of vessel 2 which is provided with an external heat-insulating coating 6. In this free space the gas having been converted in coil 1 undergoes further conversion. The final products are removed by way of pipe 4.

The invention will be further illustrated by the following example which shows how the process may be carried into practice. It is, however, to be understood that the invention is not restricted to this particular example.

*Example*

Butane is passed under a pressure of 250 atmospheres through a heating coil consisting of silicon carbide which is electrically heated so that the butane attains a temperature of 540° C. At the lower end of the coil the gas enters into a space surrounding said coil and in which a temperature of about 520° C. prevails. The products leaving this space consist of 77 per cent of unconverted butane and of 23 per cent of converted constituents which to the extent of 62 per cent consist of normally liquid substances (mainly valuable non-knocking benzines and some higher boiling hydrocarbons), the remaining 38 per cent being gaseous (8 per cent consisting of propane and propylene and 6 per cent of ethane and ethylene). The said propane, propylene, ethane and ethylene are recycled together with butane into the heating coil. The remaining gas mainly consisting of hydrogen and methane is removed and may be employed for any desired purpose.

What I claim is:

1. A process for the production of liquid hydrocarbons which comprises heating a normally gaseous paraffin hydrocarbon in a tubular space to a temperature above 500° C., the said gaseous hydrocarbon thereby being at least partly dehydrogenated, and then subjecting the dehydrogenated hydrocarbon to polymerization by passing the gas formed by the said heat-treatment through a space surrounding the said tubular space and which is maintained at an elevated temperature at least about 20° C. lower than the temperature in the latter space.

2. In the process as claimed in claim 1, passing the gas issuing from the tubular space through an outer space maintained at a temperature between 300° and 500° C.

3. In the process as claimed in claim 1, heating the gas in the tubular space to a temperature between 500° and 900° C.

4. In the process as claimed in claim 1, heating the gas under a pressure above 20 atmospheres.

5. In the process as claimed in claim 1, heat-treating the gases in spaces which are confined by a material containing elementary silicon.

MATHIAS PIER.